US009652621B2

(12) United States Patent
Johnson et al.

(10) Patent No.: US 9,652,621 B2
(45) Date of Patent: May 16, 2017

(54) ELECTRONIC TRANSMISSION SECURITY PROCESS

(71) Applicants: Michael E. Johnson, Spring Arbor, MI (US); Kenneth L. Wilson, Albion, MI (US)

(72) Inventors: Michael E. Johnson, Spring Arbor, MI (US); Kenneth L. Wilson, Albion, MI (US)

(*) Notice: Subject to any disclaimer, the term of this patent is extended or adjusted under 35 U.S.C. 154(b) by 0 days.

(21) Appl. No.: 14/713,141

(22) Filed: May 15, 2015

(65) Prior Publication Data

US 2015/0332059 A1 Nov. 19, 2015

Related U.S. Application Data

(60) Provisional application No. 61/993,817, filed on May 15, 2014.

(51) Int. Cl.
*G06F 21/60* (2013.01)
*H04L 12/24* (2006.01)
(Continued)

(52) U.S. Cl.
CPC ............ *G06F 21/606* (2013.01); *H04L 12/24* (2013.01); *H04L 41/0293* (2013.01);
(Continued)

(58) Field of Classification Search
CPC ..... G06F 21/606; H04L 63/083; H04L 63/18; H04L 63/04
See application file for complete search history.

(56) References Cited

U.S. PATENT DOCUMENTS

| 6,584,564 B2 * | 6/2003 | Olkin | H04L 12/5875 713/151 |
| 6,745,231 B1 * | 6/2004 | Megiddo | H04L 12/58 380/255 |

(Continued)

OTHER PUBLICATIONS

Samarati, Pierangela, and Sabrina De Capitani di Vimercati. "Data protection in outsourcing scenarios: Issues and directions." Proceedings of the 5th ACM Symposium on Information, Computer and Communications Security. ACM, 2010. pp. 1-14.*

(Continued)

*Primary Examiner* — Kari Schmidt
(74) *Attorney, Agent, or Firm* — Warn Partners, P.C.

(57) ABSTRACT

An electronic transmission system and method for converting and transmitting transmissions to provide secure communication between a plurality of users and protect or secure content of each transmission by preventing unauthorized individuals from capturing and viewing or hearing the transmitted content in its entirety. The electronic transmission system breaks a transmission apart into a random plurality of pieces and randomly transmits each piece separately to a plurality of remote servers. If an unauthorized party tries to intercept and access an electronic transmission, they will not be able to capture the entire transmission and will not be able to recompile its actual content, but rather misleading content. A password or other suitable authentication requirement(s) authenticates the intended recipient and allows the original pieces to be retrieved and re-compiled for viewing or hearing.

19 Claims, 5 Drawing Sheets

(51) Int. Cl.
*H04L 29/08* (2006.01)
*H04L 29/06* (2006.01)
*H04L 12/58* (2006.01)

(52) U.S. Cl.
CPC .............. *H04L 51/00* (2013.01); *H04L 63/04* (2013.01); *H04L 63/083* (2013.01); *H04L 67/02* (2013.01); *H04L 63/18* (2013.01); *H04L 67/06* (2013.01)

(56) References Cited

U.S. PATENT DOCUMENTS

| | | | | |
|---|---|---|---|---|
| 7,096,355 | B1* | 8/2006 | Marvit | H04L 63/0428 380/264 |
| 8,166,299 | B2* | 4/2012 | Kemshall | H04L 12/58 380/33 |
| 8,261,058 | B2* | 9/2012 | Peckover | G06F 21/6245 713/151 |
| 8,826,001 | B2* | 9/2014 | Betz | H04L 63/0428 705/51 |
| 8,850,180 | B2* | 9/2014 | Fein | H04L 63/04 707/E17.032 |
| 2002/0120874 | A1* | 8/2002 | Shu | G06F 11/1076 726/26 |
| 2002/0138586 | A1* | 9/2002 | Paleiov | H04L 51/063 709/207 |
| 2006/0069778 | A1* | 3/2006 | Ikegawa | H04L 67/1095 709/225 |
| 2007/0160197 | A1* | 7/2007 | Kagaya | G06Q 20/382 380/28 |
| 2009/0060198 | A1* | 3/2009 | Little | H04L 9/34 380/278 |
| 2009/0214034 | A1* | 8/2009 | Mehrotra | H04L 51/063 380/255 |
| 2010/0049966 | A1* | 2/2010 | Kato | G06F 21/556 713/153 |
| 2010/0131523 | A1* | 5/2010 | Yu | G06Q 10/107 707/756 |
| 2012/0042162 | A1* | 2/2012 | Anglin | G06F 21/57 713/165 |
| 2012/0136960 | A1* | 5/2012 | Liu | G06F 17/30159 709/217 |
| 2012/0166588 | A1* | 6/2012 | Wilkinson | G06F 3/0613 709/217 |
| 2013/0254326 | A1* | 9/2013 | Weng | H04L 67/1097 709/215 |
| 2014/0279846 | A1* | 9/2014 | Srinivasan | G06F 17/30011 707/608 |
| 2015/0244778 | A1* | 8/2015 | Zhang | G06F 15/167 709/203 |
| 2015/0293896 | A1* | 10/2015 | Runkis | G06F 9/45533 707/755 |

OTHER PUBLICATIONS

Kurra, Hemayamini, Youssif Al-Nashif, and Salim Hariri. "Resilient cloud data storage services." Proceedings of the 2013 ACM Cloud and Autonomic Computing Conference. ACM, 2013.*

A. G. Dimakis, P. B. Godfrey, Y. Wu, M. J. Wainwright and K. Ramchandran, "Network Coding for Distributed Storage Systems," in IEEE Transactions on Information Theory, vol. 56, No. 9, pp. 4539-4551, Sep. 2010.*

R. Hasan, Z. Anwar, W. Yurcik, L. Brumbaugh and R. Campbell, "A survey of peer-to-peer storage techniques for distributed file systems," International Conference on Information Technology: Coding and Computing (ITCC'05)—vol. II, 2005, pp. 205-213 vol. 2.*

* cited by examiner

ELECTRONIC TRANSMISSION SECURITY PROCESS

CROSS-REFERENCE TO RELATED APPLICATION

The instant application claims priority to U.S. Provisional Patent Application Ser. No. 61/993,817 filed May 15, 2014. The disclosure of the above application is incorporated herein by reference.

FIELD OF THE INVENTION

The present invention relates to a secure data transmission system and method for same.

BACKGROUND OF THE INVENTION

Keeping private and confidential information from "prying eyes" is a growing concern as use of electronic communication continues to increase. Electronic transmissions, such as verbal and/or written transmissions over wireless networks, can be intercepted, decrypted, read and/or overheard by unintended recipients of the communication. Current measures to secure transmissions are known to be ineffective in adequately protecting information from theft, sabotage, hackers and/or interlopers and the like.

One known type of data protection is encryption, which is typically used to mask data files to transfer data over an internet and/or to store data on a computing device in an attempt to protect its contents from view by an unauthorized individual. Typically, the data is then decrypted allowing the decrypting person to then access and view the contents of the data file.

A common problem with conventional encryption systems is that they are susceptible to a computer hacker or other unauthorized or malicious individual to break the protection and have access to the user's credentials for decryption. Credentials are known to be obtained by using back door hacking methods bypassing or otherwise overcoming any firewalls and other security protections to intercept and decrypt information.

Yet another common problem is that electronic transmission access and relationships are not readily terminable. This presents a serious security risk to confidential information associated with the users device. For example, it is well reported that employees who have been, or are about to be, terminated from employment, or have otherwise become undesired data transmitters, may be desirous of sabotaging and/or stealing trade secrets and other confidential information. Expeditiously cutting off the ability for electronic transmissions is essential to help prevent sabotage, theft or other malicious acts which would potentially result in risks to individuals, government agencies/entities, national security, business entities, and/or any other industry.

Accordingly, there exists a need to develop a more effective electronic transmission system and process that provides more secure electronic communication between a plurality of users.

SUMMARY OF THE INVENTION

In accordance with the present invention an electronic transmission system and method for transmitting any type of communication to protect or secure its contents by helping to prevent unauthorized individuals from intercepting and viewing data in human-perceivable or readable form or from intercepting and hearing verbal communication/conversations. In the event that a hacker or other unauthorized party tries to intercept and access an electronic transmission of any kind, they will not be able to easily capture the entire transmission and will not be able to easily recompile the information into an accurate perceivable form. The present invention helps to eliminate capturing all of the pieces of the entire communication, and further, without an authorized password or other suitable authenticating process, helps to eliminate viewing accurate data. It will appear to them as plausible data, but in reality is a "red herring" of erroneous or misleading data. A password or other suitable authenticating step(s) allows electronic transmissions to be compiled and viewed by the intended and authorized recipient.

The electronic transmission system and method includes at least one electronic or computing device, at least one computer operating system (e.g., Microsoft Office™, BlackBerry™ OS, Android™ OS, and etc), at least one application (e.g., Outlook™, Web Browser™, Webmail™), at least one program (e.g., electronic transmission based software), a first server (e.g., an EDM server), and a plurality of remote servers. The electronic transmission system breaks a communication apart into a plurality of pieces that are random pieces and randomly transmits each piece separately and at different times to the plurality of remote servers. The plurality of pieces are not encrypted. The intended recipient of the communication enters a predetermined password, or meets other suitable authorization parameters/steps, and the plurality of pieces are automatically retrieved and compiled into human-perceivable form for the recipients viewing of the recipient's electronic device. The plurality of pieces are automatically deleted from each of the plurality of remote servers. The electronic transmission system helps eliminate data from being captured and recreated by unauthorized individuals, e.g., internet providers. The electronic transmission system also helps to eliminate systems from being hacked and turned into spam sources, e.g., hackers cannot get into an email of a user and reconfigure the email box of the user to "spam" other email users. The system/method allows for numerous advantages within the telecommunication and other industries.

The electronic transmission system is also combinable with an encryption system including remote authentication to verify a user's credentials registered to the user's computing device and/or tied to the user on any of the user's devices and stored in at least one remote database on at least one host server or web server prior to encryption and/or decryption using at least one encryption and/or decryption key. The encryption/decryption system further includes remote delete to automatically delete encrypted data and information stored on or otherwise tied to the user's computing device when the device is connected to the internet if the user reports the computer as lost or stolen.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring to the Figures generally, an electronic transmission security system and method for same is provided for selectively converting and transmitting transmissions to provide a more secure electronic communication between a plurality of users and protect or secure the content of each transmission by preventing unauthorized individuals from capturing and viewing or hearing the transmitted content in its entirety. An electronic transmission is broken apart into a random plurality of pieces and randomly transmits each piece separately and at different times to a plurality of remote servers. If an unauthorized party tries to intercept and access an electronic transmission of any kind, they will not be able to capture the entire transmission and will not be able to recompile its content. A password, and/or other suitable authenticating step(s), authenticates the recipient and allows the plurality of pieces to be retrieved and re-compiled for viewing by the authorized recipient.

In accordance with one embodiment of the present invention, if the system is used in conjunction with existing email clients, e.g.; Outlook, Gmail, etc., once the authenticated recipient retrieves the compiled electronic transmission every piece is automatically and immediately deleted from the plurality of servers such that the only copy, apart from the user who originally compiled the data communication, is "in the hands of" the authenticated recipient. If the user deletes the sent communication from their outbox, the authenticated recipient has the only copy, which can also be deleted, and never recreated because no original piece remains or is stored anywhere for recompiling. However, in accordance with a preferred embodiment of the present invention, when used as a stand-alone system, there is no trace, or copy of the communication left in the sender's "outbox" or on the sender's device, nor is there any copy of the communication in the recipient's "Inbox". The process does not allow the communication to be saved on either the sender's or recipient's devices. The communication automatically disappears from any recipient's device or the delivery servers as soon as the communication is closed. Therefore, the communication has left no useable trace on either the sender's or recipient's device.

Optionally, there is also, a "time to live" feature that is placed on the communication by the sender, e.g., this time may be from a few minutes to a number of hours. When the "time to live" expires, the communication will disappear from the transmission servers regardless of whether the recipient opened it or not.

The figures are directed to email transmissions. These figures are exemplary. It is understood that the present invention is not limited to an email transmission security process. The term "communication" used herein includes, but is not limited to, any written, visual, audio, and/or verbal transmission of any kind and combinations thereof. It is understood that the terms "transmission" and "data" used herein includes, but is not limited to, any type of file, folders, documents, data, plaintext, electronic mail ("email"), attachments, music, photos, digital images, videos, sound, voice graphics, scanned items, spreadsheets, displays, personal information, contact lists, directories, confidential or privileged information, text messages, mobile phone messaging, instant messages, calendars, notebooks, voice over internet protocol (IP) transmissions, satellite phone communication, and any other transmission of any kind and by any kind of medium for transmitting, and combinations thereof. The term "computer" or "computing device" includes any type of medium for communication including, but not limited to, personal computers, laptop computers, handheld or portable devices such as smartphones, mobile phones, Sync™, OnStar™, Siri™, tablets, voice over internet protocol networks or technology, satellite phones, and any other medium of any kind that transfers transmissions, e.g., written, textual, visual, verbal, and/or combinations thereof are all contemplated. The term "password" is not limited to a "word" or string of characters. Depending on the particular application, it is also within the scope of the invention to enter a personal identification number (PIN) to access the sent communication, and/or other suitable authentication requirements/process set for the user to secure the user's communication to recipients, e.g., such as a process where the recipient utilizes a "trusted relationship" method, without departing from the scope of the invention. By way of non-limiting example, a trusted one-on-one relationship where the user/recipient are linked.

Figure 1A:
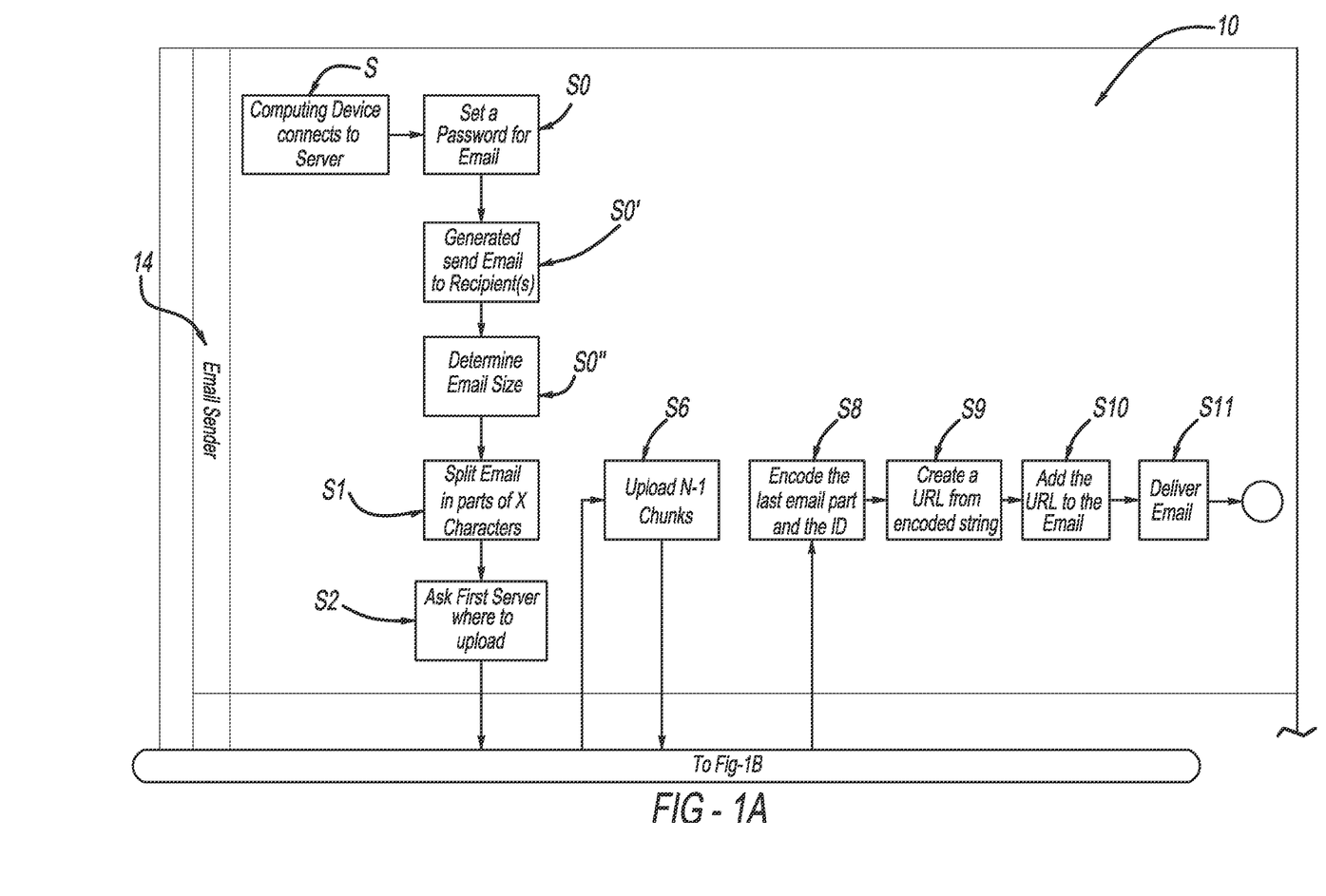
FIGS. 1A-1C is a schematic illustration of a flowchart illustrating primary processing steps of the electronic transmission system, in accordance with the present invention.
Figure 1B:
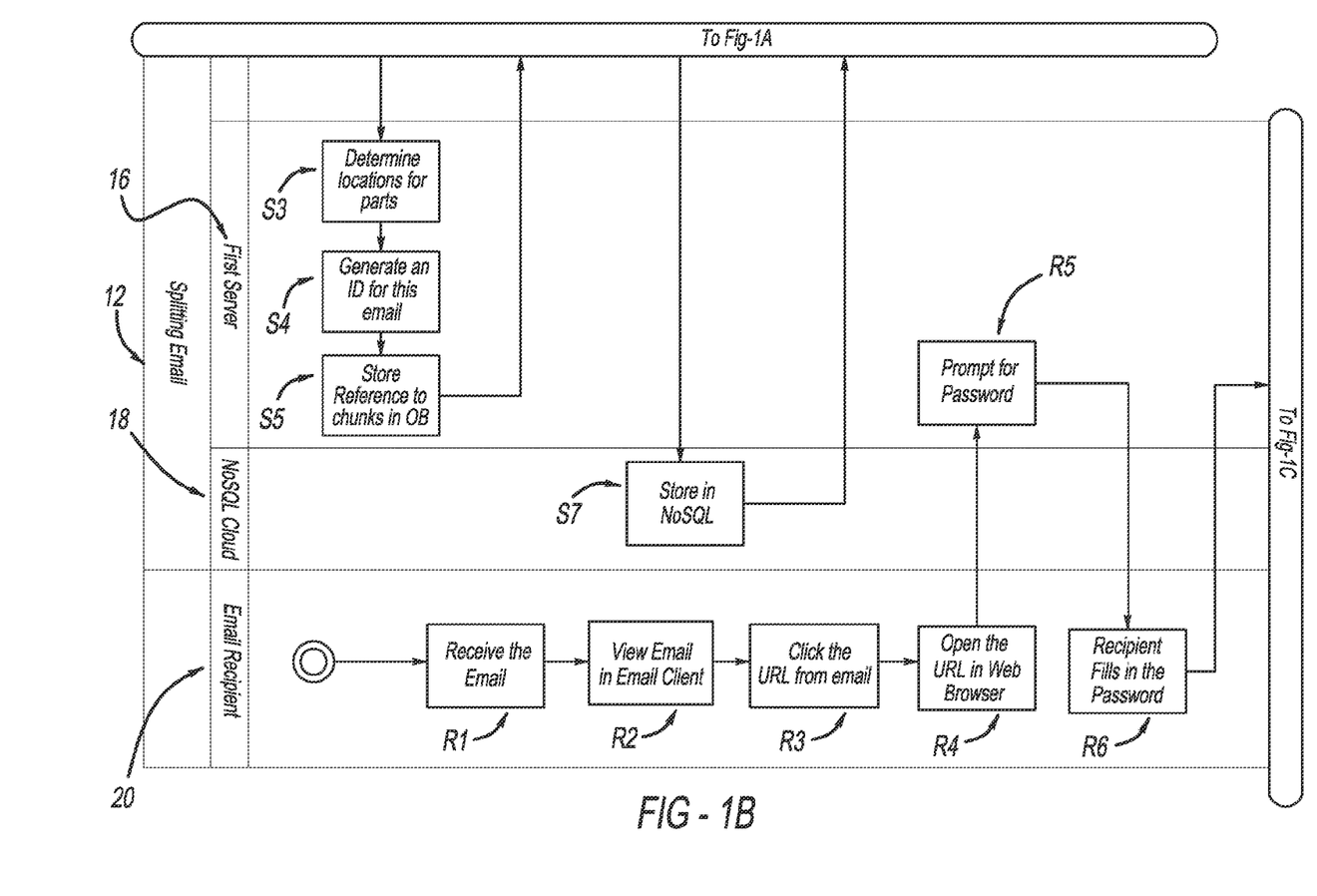
Figure 1C:
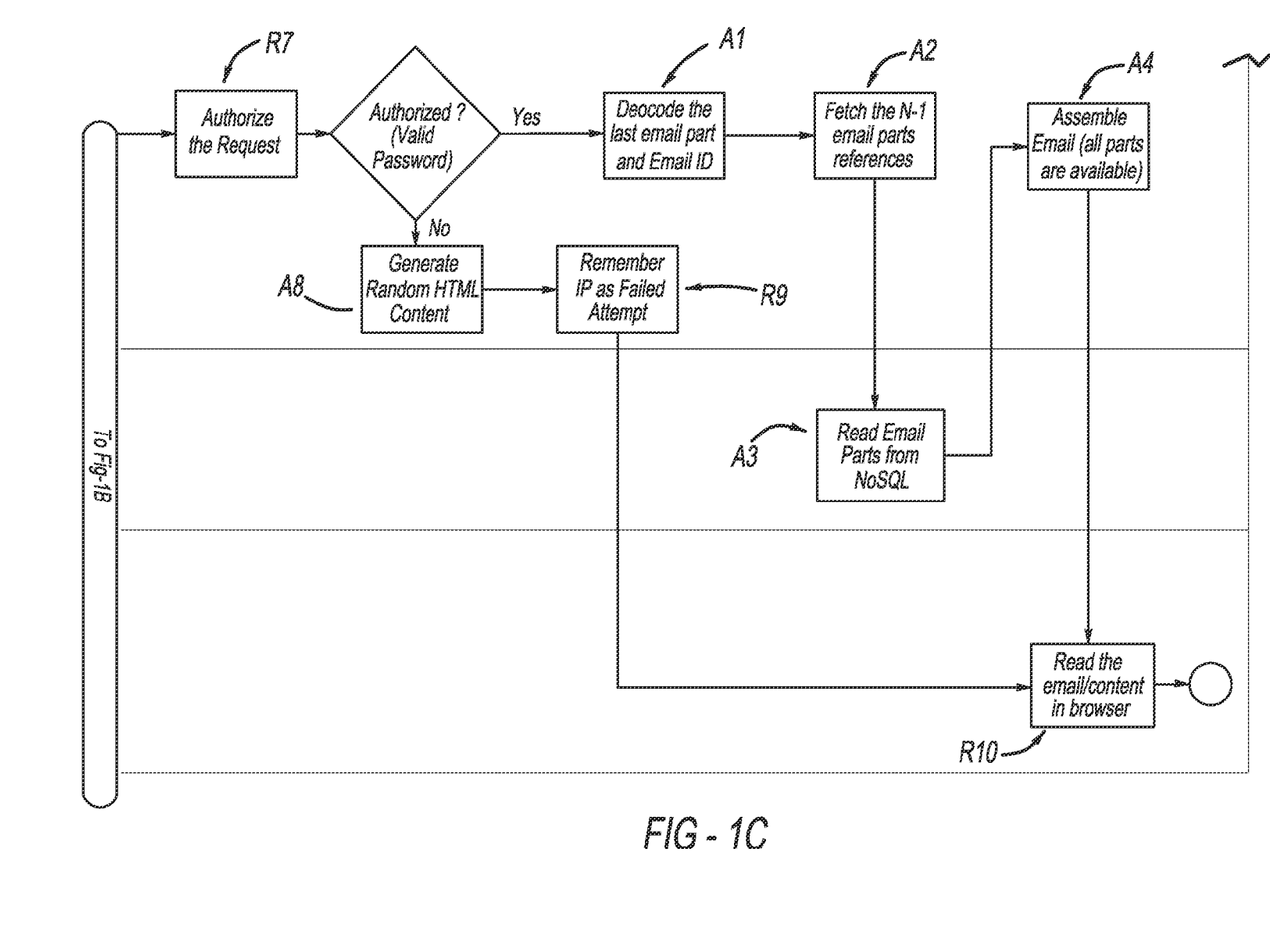

FIGS. 1A-1C is a schematic flowchart illustrating primary processing steps of the electronic transmission system, generally shown at 10, in which certain embodiments of the invention can be implemented, and including computing devices usable to implement various embodiments. Generally, the electronic transmission system includes a plurality of computing devices each having at least one application, e.g., Outlook, and at least one operating system, a first server (e.g., an EDM server), at least one program, and a plurality of remote servers.

By way of example, the electronic transmission system of the present invention is directed to enhancing email security without using encryption. The protection uses a secret sharing algorithm which comprises methods of distributing an email among a group of participants, each of whom is allocated a part of the email. The email can be reconstructed only when a sufficient number of shares are combined together; individual shares are of no use on their own. One of the advantages of this approach is that an email will be split in parts of X characters (e.g. 2000) resulting in N (e.g. 50) number of parts. N−1 parts will be stored in a NoSQL database from a secure cloud storage and 1 part will be distributed to the email recipient. All N parts will be needed for reconstructing the original email.

For retrieving the missing parts of the email, the email recipient will have to provide a password that was initially set by the email sender. If the wrong password is provided, the recipient will be provided with a valid HTML (hypertext markup language) content that has nothing to do with the real email content that was sent. This results in serving fake data in response to every incorrect guess of the password or of the email part held by the email recipient. In order to make sure that the system is protected from automated attacks (brute force), the system will return the same HTML content for a specific password or email part. In this manner, the attacker will not be able to determine if the returned content is generated by sending the same request twice.

Referring to FIGS. 1A-2B generally, the electronic transmission system 10 provides a security process, where the first stage of the process is represented by a splitting procedure indicated generally at 12, e.g., splitting of email. The following activities occur during the splitting procedure 12: at a first step, an email sender indicated generally at 14 logs onto an email client (e.g., Outlook) and the client connects to at least one first server indicated generally at 16 using a computing device indicated generally at S. The email sender 14 or "user" sets a password, or other authentication such as a PIN and/or trusted relationship process, used for protecting the email shown generally at step S0. The body of the email is generated by the email sender and addressed to at least one recipient, and the email sender commands the email to be sent to the listed recipients at step S0'. The email size is then analyzed at step S0" and the program decides the number of email parts; the email is automatically split in "N" number of parts shown generally at S1.

The first server 16 is automatically informed that N−1 parts are needed to be uploaded, and the first server 16 is asked where to upload at step S2. The first server 16 operably determines where to upload the parts (or "pieces") on the cloud, shown generally at S3. This will be accomplished by using several NoSQL instances in order to store the email parts in different parts of the world. By way of non-limiting example, if an email is broken into 20 pieces the pieces do not go out all at the same time; e.g., one piece goes out and a millisecond later a second pieces goes out, and etc, until all of the pieces have randomly gone out to various locations.

A unique identification (ID) is generated for the current email shown generally at step S4. This unique ID is then saved in the local database of first server 16 together with the references to the N−1 parts, shown generally at S5. As shown generally at step S6, the N−1 email parts are sent to the cloud service. There is no relation between these parts at the cloud server level. Thus, an entity analyzing the cloud service is not able to determine which parts or pieces in the cloud are part of the same email. As shown generally at S7, the N−1 parts are stored on the cloud service (e.g., NoSQI cloud) indicated generally at 18. Thus, the email is broken on the client side into a plurality of random pieces which are then sent to a plurality of random servers (e.g., a block of dedicated servers, 20+/−servers, 500 business entity servers, donated open-source servers, etc. and/or combinations thereof), and predetermined N parts are needed for reconstructing the original email for viewing on the recipients end, which will be explained in greater detail below.

Neither the first server 16 nor the cloud service 18 will be able to reconstruct the original email as the last part of the email is unknown and is only available in the email body which is accessible only by the sender. In accordance with one embodiment of the present invention, if the sender deletes the email from the sender's outbox the email body is not accessible by the sender or any entity hacking into the sender's outbox, as set forth previously. Spammers are also unable to reconfigure the sender's email box to spam other people.

in accordance with a preferred embodiment of the present invention, when used as a stand-alone system, there is no trace, or copy of the communication left in the sender's "outbox" or on the sender's device, nor is there any copy of the communication in the recipient's "Inbox". The process does not allow the communication to be saved on either the sender's or recipient's devices. The communication automatically disappears from any recipient's device or the delivery servers as soon as the communication is closed. Therefore, the communication has left no useable trace on either the sender's or recipient's device.

As shown generally at step S8, the last email part together with the email ID are encoded in a single string. A URL (uniform resource locator) is created based on the encoded string shown generally at S9. This URL contains the part that is unknown by the first server 16 or cloud service 18. As indicated generally at S10, the URL is added to the email so the recipient can have access to the last email part. The email is delivered using the installed email client (e.g. Outlook, Web Browser), as indicated generally at S11.

A second stage of the process is represented by the re-assembling of the email at the recipient side, shown generally at 20. The following activities occur during the assembling procedure: as shown generally at step R1, the email is received by the recipient. The email recipient visualizes the email in the installed email client (e.g., Outlook), as indicated generally at R2. The recipient clicks on the URL present in the email, as shown generally at R3. As shown generally at R4, the URL is opened in the installed web browser. The URL is "pointing" to the first server 16 web address.

The first server 16 prompts for the password filed (and provided to the recipient) by the email sender, shown generally at R5. The recipient fills in the password, shown generally at R6. As indicated generally at R7 the first server 16 is authorizing the request by validating at least the following: The IP that makes the request is not temporary banned; the received encoded string contains an email ID (identification) and an email part; the email ID exists in the local database; the password is the correct one.

As shown generally at R8, if the conditions from step R7 are not positive, the first server 16 will generate random email content/HTLM content for misleading the email recipient. This generated HTML content is viewable by the recipient in the browser as indicated at step R10. As shown generally at R9, if the authorizing/authenticating conditions from R7 are not positive, the server will also remember the number of failed attempts from that IP address (internet protocol address).

However, if the conditions from step R7 are positive, the string is decoded (e.g., string generated from steps S8-S10) for determining the email ID and last part of the email, as shown generally at A1. The "N−1" parts stored on the cloud server 18 are retrieved as indicated generally at A2. The cloud server 18 reads the email parts from the NoSQL storage, as shown generally at A3. The email is re-assembled as all "N" parts are accessible as indicated generally at A4. As shown generally at R10, the authorized email recipient 22 is able to view the original email, while the unauthorized recipient views the generated HTML content in the browser, e.g., "red herring"/misleading content.

An email recipient 22 will never receive an "Invalid password", a "Non existing email" message, or any other message that "tips" an unintended recipient off. The recipient will always receive a HTML content from the first server 16. Only by reading the returned HTML content can the recipient determine if the email was successfully fetched or not. The recipient will get content from the first server 16 that will make it very difficult to understand if the message is real or a generated one.

Figure 2A:
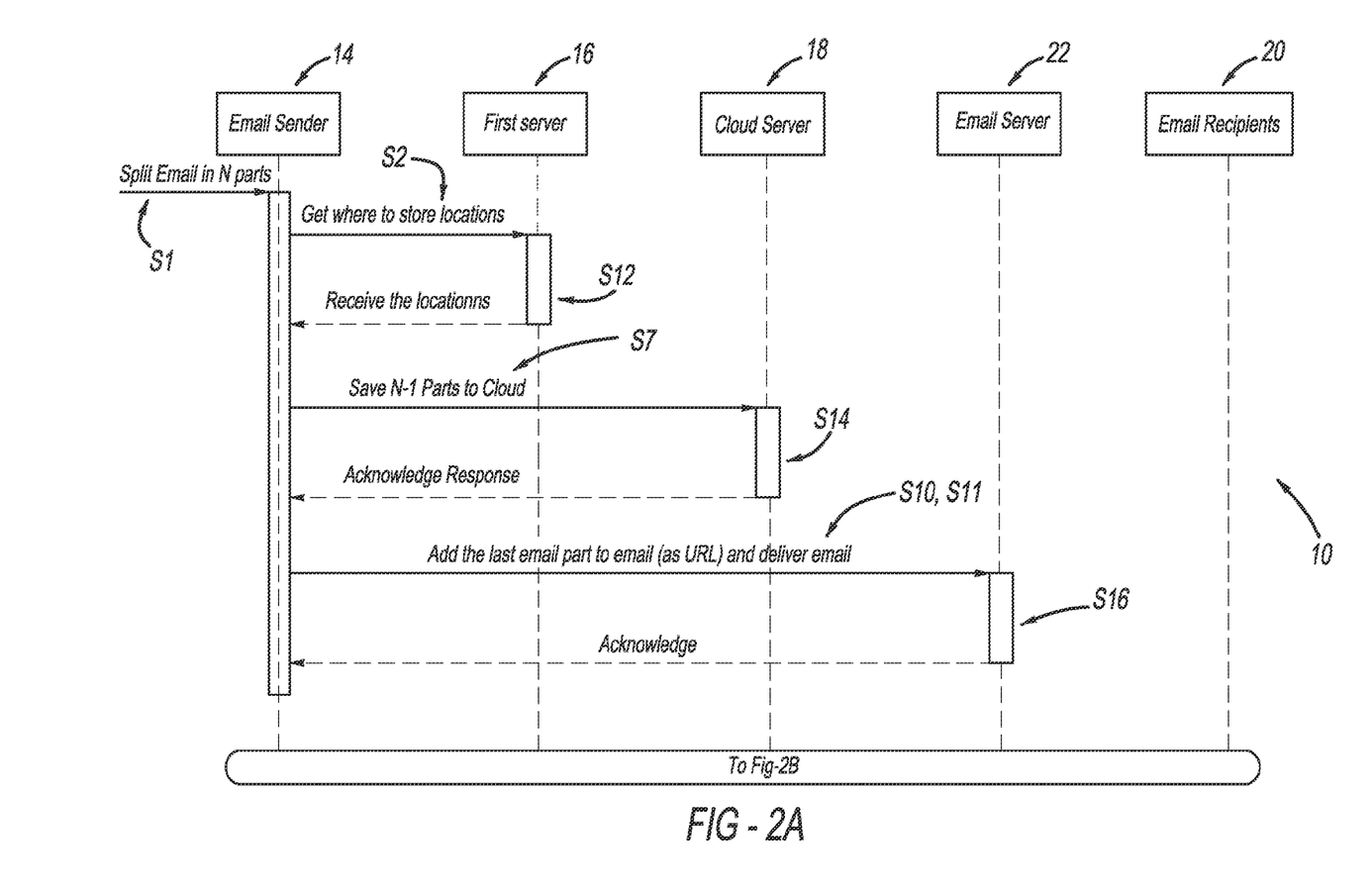
FIGS. 2A-2B is a schematic illustration of a diagram depicting primary sequence of processing steps of the electronic transmission system, in accordance with the present invention.
Figure 2B:
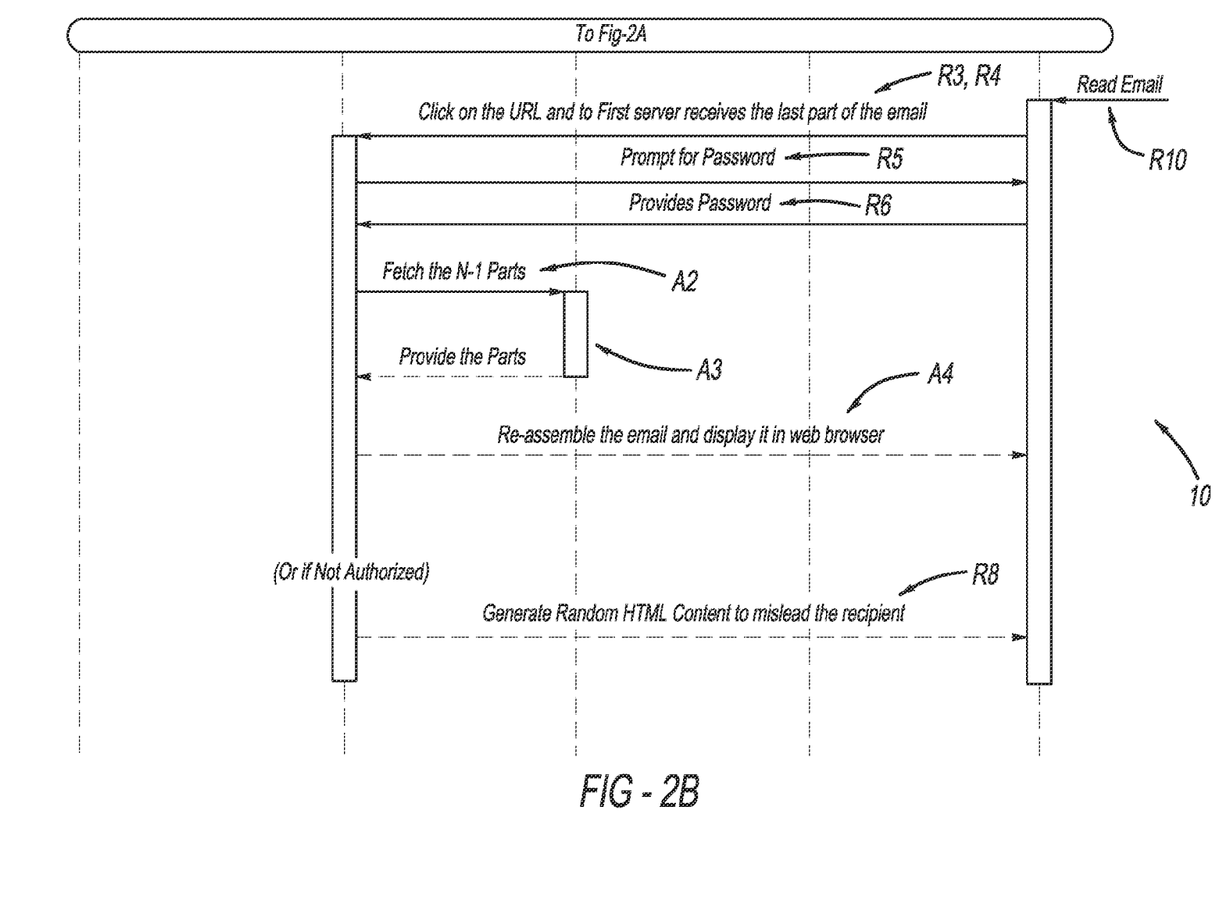

Referring to FIGS. 1A-2B generally, and more particularly to FIGS. 2A-2B, there is depicted a sequence diagram of some primary steps in accordance with the electronic transmission system 10 of the present invention. The email is split into "N" parts at step S1. The first server 16 is asked what locations to use for uploading the parts and those locations are communicated to the email client, as indicated generally at S2, S12. "N−1" parts are saved to the cloud server 16, as indicated generally at S7, and the email sender 14 receives an acknowledgement response generally shown at S14. The program adds the last email part to the email (as URL), and the installed email client delivers the email, as indicated generally at S10, S11, using an email server, shown generally at 22. The email sender 14 is sent an acknowledgement response generally at S16.

Indicated generally at R3, R4, the email recipient 20 clicks on the URL to the first server 16 received in the last part of the email (the first server 16 also cannot reconstruct the original email without receiving this part present in the email body). The first server 16 prompts the email recipient 20 for a password R5 and the email recipient 20 provides/enters the password R6. If recipient authorization is validated, the first server 16 fetches the N−1 parts from the cloud server 18 as indicated at A2 and the cloud server 18 provides the N−1 parts to the first server 16 as shown generally at A3. The first server 16 re-assembles the email and display it in web browser as shown generally at A4. Alternatively, the email recipient 20 is then able to view the original email on the client end of the recipient R10. If the recipient is not authorized, the first server 16 generates random HTML content to mislead the email recipient 20 (or hacker, transmission interceptor, interloper, etc).

The main advantages of this process of electronic transmission of emails includes, but is not limited to: (1) email travels faster as only a part of the original email content is present in the body; (2) intercepting emails by filters will not be possible as the content is not readable; (3) the first server cannot reconstruct the original email without having the part present in the email body; (4) the approach allows email recipients to view the email without the need to install additional software. The email is displayed in the web browser regardless of the used platform; (5) the split email parts cannot be retrieved unless the recipient knows the password set by the email sender; (6) the system can be extended with additional features: e.g., Email Expiration, Authentication, encryption, remote deletion, etc.; and (7) in case the provided password is incorrect or if the email part provided by the recipient is wrong, the server will return a plausible-looking yet incorrect HTML content for misleading the recipient. This approach brings decoys and deception to the recipient that wants to guess the password or a part of the email. This is a significant benefit over conventional systems.

The electronic transmission system/method 10 is not limited to email transmission applications, and is suitable to meet any kind of electronic transmission specifications and functionality with respect to securing those transmissions. By way of non-limiting example, the electronic transmission system 10 splits conversations into a plurality of parts, e.g., voice over IP transmission is employed and the transmission from one individual to at least one other individual is broken into a plurality of pieces, transmitted randomly, and then recompiled. This can happen at both client ends such that the back and forth transmissions are secure. Another example is a mobile phone conversation is split on at least one client end into a plurality of pieces and transmitted to a plurality of cell towers, e.g., 5-6 or more towers, such that a single tower, or a device that mimics a single tower employed by an interloper, cannot intercept and listen in on or otherwise recompile the conversation.

In accordance with another embodiment of the present invention, the electronic transmission system 10 is combinable with an encryption system. Encrypting the transmission transforms the data contents into a series of letters, numbers, symbols, and/or combinations thereof that is not human-perceivable or readable to help secure its content from an unauthorized party. Any encrypted data remains unperceivable until decrypted. By way of non-limiting example, the encryption system includes remote authentication to implement user credential authentication for decryption and/or automatic data deletion of compromised data. The combined electronic transmission and encryption features reduce or eliminate transmission interception, decryption, and unpermitted viewing and/or hearing of the transmission. In addition, this further reduces or eliminates loopholes and/or backdoor hacking capabilities.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A computer-implemented method of securing electronic transmissions, the computer-implemented method comprising the steps of:
   providing a plurality of remote servers; providing a first server;
   setting a user authentication associated with at least one electronic transmission;
   receiving a request that the electronic transmission of the user he sent to a plurality of recipients;
   analyzing the electronic transmission content and/or size;
   splitting the electronic transmission into a plurality of parts that are random content and/or sizes;
   uploading, at different random times, all but one part of the plurality of parts to the plurality of remote servers randomly chosen by the first server;
   sending an uniform resource locator (LTRL) to at least one of the recipients;
   determining authorization for the at least one recipient to view the electronic transmission; and
   reconstructing the plurality of parts and displaying the electronic transmission content to the at least one recipient when the recipient is authorized; and
   determining at least one predetermined condition is not met and blocking access to the electronic transmission by the recipient, wherein this determination and blocking of access further comprises:
   determining that there is not a password match;
   determining that the recipient is not authorized
   generating random incorrect hypertext markup language (HTML) content by the first server that has nothing to do with the actual content of the electronic transmission that was sent by the user;
   displaying said incorrect HTML content to mislead the at least one recipient.

2. The method of claim 1, wherein the method does not include encrypting the electronic transmission.

3. The method of claim 1, further comprising connecting to a first server prior to setting the user authentication.

4. The method of claim 3, further comprising storing the user authentication at the first server, wherein the user authentication is a user created password.

5. The method of claim 1, further comprising providing a client installed on the computing device for delivering the electronic transmission from the user to a plurality of recipients.

6. The method of claim 1, further comprising, prior to uploading the plurality of parts, the steps of:

requesting the first server to identify locations to upload the plurality of parts;

determining locations for the plurality of parts, where the locations are chosen by the first server;

generating a unique identification for the electronic transmission; and storing a plurality of references corresponding to each of the plurality of parts, respectively, in a database of the first server.

7. The method of claim 6, further comprising encoding the one part not uploaded and the unique identification in a single encoded string before creating the URL, wherein the URL is created from the encoded string.

8. The method of claim 7, further comprising sending the one part not uploaded along with the uniform resource locator (URL) to at least one of the recipients in the electronic transmission.

9. The method of claim 1, wherein determining authentication for the at least one recipient to view the electronic transmission further comprises:

accessing the URL from the electronic transmission;

prompting the at least one recipient to enter a user created password;

comparing the password as entered by the at least one recipient with the user created password stored on the first server for authentication of the password entered by the recipient.

10. The method of claim 9, wherein the one part not uploaded to the plurality of servers is only contained in the body of the electronic transmission which is accessible only by the user and authorized recipient.

11. The method of claim 9, wherein accessing the URL further comprises clicking on the URL from the electronic submission and opening the URL in a web browser.

12. The method of claim 9, further comprising authorizing access to the electronic transmission by the recipient upon entering a valid password by the recipient, wherein authorization further comprises:

decoding the one part and the unique identification;

retrieving the plurality of parts from the plurality of remote servers;

reassembling the plurality of parts; and displaying the electronic transmission in the web browser for view by the at least one recipient.

13. The method of claim 9, further comprising determining predetermined conditions are met for authorizing access to the electronic transmission by the recipient, wherein this determination and authorization further comprises:

determining the password entered by the recipient is valid;

determining the internet protocol address is banned;

determining the encoded string contains the unique identification and the one part not uploaded;

determining the unique identification exists in the first server;

decoding the one part and the unique identification upon completion of all of these predetermined conditions;

automatically retrieving the plurality of parts from the plurality of remote servers;

reassembling the plurality of parts; and displaying the electronic transmission in the web browser for view by the at least one recipient.

14. The method of claim 1, wherein there is no relationship between the plurality of parts stored on the plurality of servers.

15. The method of claim 1, further comprising storing the plurality of parts on the plurality of remote servers for a predetermined amount of time and automatically deleting the plurality of parts from the plurality of remote servers upon reconstructing of the electronic transmission.

16. The method of claim 1, wherein the electronic transmission is selected from the group consisting of at least one written, visual, audio, verbal, file, folder, document, data, plaintext, electronic mail, attachment, music, photo, digital image, video, sound, voice graphic, scanned item, spreadsheet, display, personal information, contact list, directory, confidential or privileged information, text message, mobile phone messaging, instant message, calendar, notebook, voice over internet protocol transmissions, satellite phone communication, and combinations thereof.

17. A computer-implemented method of securing electronic transmissions between computing devices, the computer-implemented method comprising the steps of:

providing a first server;

providing a cloud service with a plurality of servers;

connecting a user of a computing device to the first server;

setting a user authentication to be associated with at least one electronic transmission;

receiving a request that the electronic transmission created by the user be sent to a plurality of recipients;

determining the electronic transmission content and/or size;

splitting the electronic transmission into a plurality of parts that are random content and/or sizes;

determining which plurality of servers to upload the plurality of parts;

generating a unique identification for the electronic transmission;

storing a plurality of references corresponding to each of the plurality of parts in a database of the first server;

uploading, separately and at different random times, all but a last part of the plurality of parts automatically to the plurality of remote servers randomly determined by the first server;

encoding the last part and the unique identification, and creating a uniform resource locator (URL);

sending the URL to the plurality of recipients;

determining the authentication for viewing the electronic transmission;

wherein the plurality of parts are reassembled and displayed to each authorized recipient upon authentication, and wherein random incorrect misleading hypertext markup language (HTML) content is generated and displayed to each unauthorized recipient without authentication.

18. The method of claim 17, further comprising determining predetermined conditions are met to provide authorization for viewing the electronic transmission, wherein the determination and authorization to view further comprises:

determining a password entered by the recipient is valid and/or determining the user and recipient are linked; and/or determining the internet protocol address is banned; and/or determining the encoded string contains the unique identification and the one part not uploaded; and/or determining the unique identification exists in the first server;

decoding the last part and the unique identification upon completion of these predetermined conditions;

automatically retrieving the plurality of parts from the plurality of remote servers;

reassembling the plurality of parts; and displaying the electronic transmission in the web browser for view by the authorized recipient.

19. A computer-implemented method of securing electronic transmissions of a computing device, the computer-implemented method comprising the steps of:
providing a client installed on the computing device for delivering the electronic transmissions;
providing a not only structured query language (NoSQI) cloud with a plurality of remote servers;
providing at least one first server;
setting a user authentication associated with at least one electronic transmission, and storing the user authentication on the first server;
receiving a request that the electronic transmission created by the user be sent to at least one recipient;
analyzing the electronic transmission content and/or size;
splitting the electronic transmission into a plurality of parts on the client-side, which plurality of pieces are random pieces which are sent to the plurality of servers that are also random;
uploading, separately and at different random times, all but a last part of the plurality of parts to the plurality of remote servers, wherein neither the first server nor the NoSQI cloud service is able to reconstruct the electronic transmission since the last part of the electronic transmission is only available in the body of the electronic transmission accessible only by the user who created the electronic transmission;
storing all but the last part of the plurality of parts on the plurality of remote servers;
delivering a uniform resource locator (URL) in a transmission to at least one of the recipients, wherein the URL is created from an encoded string of the last part and/or a unique identification generated for the electronic transmission;
opening the URL in a web browser;
determining user authentication requirements for authorizing the at least one recipient to view the electronic transmission; and
reassembling the plurality of parts and displaying the electronic transmission content to the at least one recipient upon authorization of the recipient and automatically deleting the plurality of parts from the plurality of remote servers upon reassembling of the electronic transmission, and generating and displaying random misleading hypertext markup language content to any unauthorized recipient.

\* \* \* \* \*

UNITED STATES PATENT AND TRADEMARK OFFICE
CERTIFICATE OF CORRECTION

| | | |
|---|---|---|
| PATENT NO. | : 9,652,621 B2 | Page 1 of 1 |
| APPLICATION NO. | : 14/713141 | |
| DATED | : May 16, 2017 | |
| INVENTOR(S) | : Michael E. Johnson et al. | |

It is certified that error appears in the above-identified patent and that said Letters Patent is hereby corrected as shown below:

In the Specification

Column 5,
Lines 15, "SO'" should be -- S0' --.

Column 5,
Lines 16, "SO"" should be -- S0" --.

Column 6,
Line 34, "HTLM" should be -- HTML --.

In the Claims

Column 8,
Line 29, Claim 1, "he" should be -- be --.

Column 8,
Line 36, Claim 1, "(LTRL)" should be -- (URL) --.

Signed and Sealed this
First Day of August, 2017

Joseph Matal
*Performing the Functions and Duties of the*
*Under Secretary of Commerce for Intellectual Property and*
*Director of the United States Patent and Trademark Office*